United States Patent [19]

Cook

[11] 4,176,201

[45] Nov. 27, 1979

[54] SWEETENING COMPOSITION

[75] Inventor: Marvin K. Cook, Port Charlotte, Fla.

[73] Assignee: MacAndrews and Forbes Company, Camden, N.J.

[21] Appl. No.: 854,604

[22] Filed: Nov. 25, 1977

[51] Int. Cl.$^2$ .............................................. A23L 1/236
[52] U.S. Cl. .................................... 426/548; 426/558; 426/565; 426/602; 426/658; 426/804
[58] Field of Search ............... 426/548, 658, 804, 558, 426/565, 602

[56] References Cited

U.S. PATENT DOCUMENTS

| | | | |
|---|---|---|---|
| 3,104,171 | 9/1963 | Sakazuchi et al. | 426/60 |
| 3,408,206 | 10/1968 | Yamazaki et al. | 426/537 |
| 3,625,711 | 12/1971 | Eisenstadt | 426/548 |
| 3,647,482 | 3/1972 | Yueh | 426/537 |
| 3,647,483 | 3/1972 | Eisenstadt | 426/548 |
| 3,851,073 | 11/1974 | Cook | 426/660 X |
| 3,875,311 | 4/1975 | Eisenstadt | 426/548 |
| 3,875,312 | 4/1975 | Eisenstadt | 426/548 |

FOREIGN PATENT DOCUMENTS 51-6230 2/1976 Japan ........................ 426/548

*Primary Examiner*—Raymond N. Jones
*Assistant Examiner*—Esther M. Kepplinger
*Attorney, Agent, or Firm*—Howson and Howson

[57] ABSTRACT

A sweetening composition consisting essentially of lactose or sorbitol, potassium bitartrate, ammoniated glycyrrhizin and a 5'-nucleotide.

3 Claims, No Drawings

SWEETENING COMPOSITION

BACKGROUND OF THE INVENTION

Efforts to develop low calorie sweeteners which will eliminate or substantially reduce the amount of sugar (sucrose) used in foods, beverages and confections continue as limitations on use of synthetic sweeteners are imposed by the Food and Drug Administration. Most recently, the severe limitations suggested on use of saccharin has intensified the search for new low calorie sweeteners.

U.S. Pat. No. 3,851,073 describes sweetening compositions comprising ammoniated glycyrrhizin and an amount of a 5'-nucleotide sufficient to repress the licorice flavor of ammoniated glycyrrhizin. The sweetening compositions described in this patent have met with commercial acceptance, and further development work has led to the compositions of this invention.

DETAILED DESCRIPTION OF THE INVENTION

According to this invention, there is provided a novel sweetening composition consisting essentially of about 85% to about 95% of a member selected from the group consisting essentially of lactose and sorbitol, about 2.5% to about 7.5% potassium bitartrate, about 2.5% to about 7.5% ammoniated glycyrrhizin and from about 0.025% to about 0.075% of a 5'-nucleotide, said percentages being by weight, based on the weight of the composition.

Ammoniated glycyrrhizin is derived from licorice root, and is obtained by ammoniation of glycyrrhizic acid to replace one or more of the three acid hydrogen atoms with ammonium. Therefore, the term "ammoniated glycyrrhizin" includes a mono-ammoniated product, a di-ammoniated product, and, theoretically, includes a tri-ammoniated product, although there is some indication that the tri-ammoniated salt may not actually be produced. As used in the present specification and claims, the term ammoniated glycyrrhizin is meant to include mono-ammoniated, di-ammoniated and tri-ammoniated glycyrrhizin as well as mixtures thereof.

Ammoniated glycyrrhizin has a sweetness value about 50 times that of sucrose, and is presently the only manufactured flavorant which is on the FDA list of natural flavorants generally recognized as safe. Ammoniated glycyrrhizin has the characteristic licorice flavor, and because of this flavor, ammoniated glycyrrhizin has not been used alone as a sweetening agent except in some licorice-flavored confections, since the amount required for sweetening also imparts the characteristic licorice flavor. Fully ammoniated glycyrrhizin is completely soluble in hot and cold water. On the other hand, mono-ammoniated glycyrrhizin is only sparingly soluble in cold water, i.e. 0.1% at 20° C., and not much more soluble in hot water. The poor solubility of mono-ammoniated glycyrrhizin has served to limit use of this compound as a low calorie sweetener.

It has now been determined that combining ammoniated glycyrrhizin with an essentially equivalent amount, by weight, of cream of tartar and a small but effective amount of a 5'-nucleotide and lactose or sorbitol provides a sweetening composition which can be used in place of sucrose and other sugars in food products such as cakes, pies and confections. The sweetening composition is low in calories, is quite soluble in water and water base liquids, and does not possess any objectionable flavor or aftertaste characteristic of most artificial sweeteners.

Cream of tartar, also known as potassium bitartrate, is a readily available commodity and there are no special attributes this material must have so long as it is of food grade quality.

The 5'-nucleotides which may be used in this invention include both naturally occurring and synthetic types, provided they are palatable. Thus, useful 5'-nucleotides include 5'-inosinic acid, 5'-guanylic acid and the sodium salts of such acids. Suitable synthetic 5'-nucleotides are disclosed in U.S. Pat. No. 3,408,206. The term "5'-nucleotide" as used in this invention includes any physiologically acceptable and edible nucleotide as well as edible salts thereof. A preferred 5'-nucleotide comprises a mixture of the disodium salts of 5'-inosinic and of 5'-guanylic acid.

Lactose, or milk sugar, is a sugar characterized by good water solubility and poor sweetness properties. In terms of relative sweetness, lactose ranks among the lowest of the sugars. In addition to lactose, sorbitol, a nonnutritive polyol sweetener may be used in the sweetening compositions of this invention. Sorbitol, like lactose, has low sweetening properties, and is used in the same proportion as lactose in the sweetening compositions of this invention. As the result of the present invention, there is provided a sweetening composition which has the water solubility of lactose or sorbitol and the sweetening characteristics of ammoniated glycyrrhizin without the licorice flavor usually associated with ammoniated glycyrrhizin.

In a preferred embodiment of this invention, the sweetening composition consists essentially of about 89.5% lactose or sorbitol, about 5% potassium bitartrate, about 5% ammoniated glycyrrhizin, and about 0.05% of a 5'-nucleotide.

The following examples are provided to further illustrate the invention:

EXAMPLE 1

Sweetener Composition A 89.95 parts of lactose, 5 parts of potassium bitartrate, 5 parts of mono-ammoniated glycyrrhizin and 0.05 parts of a 5'-nucleotide were thoroughly mixed to provide a uniform mixture.

Sweetener Composition B 89.95 parts of sorbitol, 5 parts of potassium bitartrate, 5 parts of mono-ammoniated glycyrrhizin and 0.05 parts of a 5'-nucleotide were thoroughly mixed to provide a uniform mixture.

0.25 g. of Sweetener Composition A or B will sweeten beverages such as 8 oz. of hot coffee or tea without causing any bitter or licorice aftertaste. The sweetness level obtained is more intense than that achieved with two level teaspoons of sucrose in 8 oz. of hot coffee or tea and somewhat less sweet than that obtained when 40 mg. of saccharin is used to sweeten 8 oz. of hot coffee or tea initially. However, after sipping beverages sweetened with sweetener composition A or B, the well known cumulative effect of the sweeteners, renders the level of sweetness comparable to that of saccharin.

EXAMPLE II

Chocolate Cookies 0.25 lbs. of sweetener composition A (Example I), 3 lb. shortening, 0.75 lbs. dutched cocoa (10–12% butterfat), 3–5 lbs. flour, 0.5 lb. whole milk powder, 1 lb. whole eggs, liquid, 2 oz. vanilla extract, single-fold, 0.5 oz. baking powder and 0.5 g. water were mixed to form a cookie batter. The cookies were baked at 425° F. and were adequately sweet without bitter or licorice aftertaste and had excellent chocolate flavor.

Ice Cream 40 lb. of 35% cream, 15 lb. 70% sorbitol solution, 7 lb. sodium caseinate, 0.2 lb. carboxy methyl cellulose, 0.5 lb. sweetener Composition A (Example I), 37.3 lb. water and flavorant sufficient to provide desired flavor were mixed and frozen into a diabetic ice cream. The ice cream has 620 calories per unit and a sweetness comparable to ice cream frozen from a like mixture in which 0.25 lb. saccharin was used in place of sweetener Composition A.

EXAMPLE III

An imitation low-calorie maple flavored syrup was prepared from the following recipe.

0.1 g. Imitation Maple flavor
0.8 g. Kelcoloid HV
1.0 g. Sweetener Composition A (Example I)
0.1 g. Salt
0.1 g. Sodium benzoate
0.1 g. Potassium sorbate
0.25 g. Caramel color
0.025 g. Citric acid
97.25 g. Water The syrup had a maple flavor and no licorice flavor usually associated with ammoniated glycyrrhizin.

A low calorie mayonnaise free of licorice flavor was prepared from the following recipe.

1.5 g. Gum tragacanth
3.5 g. Corn starch
0.5 g. Agar powder
9.0 g. Vinegar
12.0 g. Vegetable oil
0.2 g. Onion powder
0.1 g. Garlic powder
0.5 g. Lemon juice
2.0 G. Sweetener Composition A (Example I)
0.1 g. Potassium sorbate
0.1 g. Sodium benzoate
69.9 g. Water
8.5 Certified color

Having thus described the invention, what is claimed is:

1. A sweetening composition consisting essentially of about 85% to about 95% sorbitol, about 2.5% to about 7.5% potassium bitartrate, about 2.5% to about 7.5% ammoniated glycyrrhizin and about 0.025% to about 0.075% of a 5'-nucleotide, said percentages being by weight, based on the weight of the composition.

2. The sweetening composition of claim 1 consisting essentially of about 89.5% sorbitol, about 5% potassium bitartrate, about 5% ammoniated glycyrrhizin and about 0.05% of a 5'-nucleotide.

3. A food product containing the sweetening agent of claim 1 in an amount sufficient to sweeten.